Nov. 1, 1960 J. R. MONTGOMERY ET AL 2,958,476

TAPE RECORD MACHINE

Filed Oct. 31, 1957 4 Sheets-Sheet 1

INVENTORS
JOHN R. MONTGOMERY
RALPH H. SHERMAN, JR.
BY
Curtis, Morris & Safford
ATTORNEYS Nov. 1, 1960 J. R. MONTGOMERY ET AL 2,958,476

TAPE RECORD MACHINE

Filed Oct. 31, 1957 4 Sheets-Sheet 2

INVENTORS
JOHN R. MONTGOMERY
RALPH H. SHERMAN, JR.
BY
Curtis, Morris & Safford
ATTORNEYS Nov. 1, 1960 J. R. MONTGOMERY ET AL 2,958,476

TAPE RECORD MACHINE

Filed Oct. 31, 1957 4 Sheets-Sheet 3

INVENTORS
JOHN R. MONTGOMERY
RALPH H. SHERMAN, JR
BY
Curtis, Morris & Safford
ATTORNEYS Nov. 1, 1960 J. R. MONTGOMERY ET AL 2,958,476

TAPE RECORD MACHINE

Filed Oct. 31, 1957 4 Sheets-Sheet 4

INVENTORS
JOHN R. MONTGOMERY
RALPH H. SHERMAN, JR.
BY
Curtis, Morris & Safford
ATTORNEYS United States Patent Office 2,958,476
Patented Nov. 1, 1960

2,958,476

TAPE RECORD MACHINE

John R. Montgomery, Trumbull, and Ralph H. Sherman, Jr., Fairfield, Conn., assignors to Dictaphone Corporation, Bridgeport, Conn., a corporation of New York Filed Oct. 31, 1957, Ser. No. 693,585

13 Claims. (Cl. 242—55.12)

This invention relates to sound reproducing machines employing magnetic tape records and more particularly to such a machine especially suited for transcribing speeches, lectures, dictation, and the like.

An object of this invention is to provide an easily portable machine of this kind which is simple and convenient to use and which is practically impossible for anyone to make mis-function or to use improperly.

Another object is to provide a tape record machine of this kind which can economically be manufactured and sold in commercial quantities.

Still another object is to provide such a machine which is highly efficient in operation and quick in response but yet extremely rugged and reliable.

These and other objects will in part be understood from and in part pointed out in the description given hereinafter.

In transcribing long speeches, lectures, dictation and the like from a record, it is customary for the typist to listen to a portion of the record, stop the record and type out what he has heard, and then listen to another portion to be typed, and so on. Frequently he must backspace the record to repeat a part he failed to understand the first time. Accordingly, in the course of transcribing a single record, the reproducing machine must be started, stopped, reversed and re-started innumerable times. The machine in the course of normal operation is subjected, therefore, to much more than average wear and tear and accordingly it must be ruggedly and reliably built. Moreover, to ease as far as possible the transcriber's task in operating the machine, it is essential that it be especially convenient and easy to operate and that it respond to its controls with the least possible delay. The present invention provides such a machine which also is small enough and light enough to be easily carried from one place to another as required.

Commercially available tape record machines, such as those intended for home recording and playback of music, are primarily designed to run at constant speed for long uninterrupted periods of time. Though some of these machines have push-buttons for starting, stopping and rewind, and others have even foot-operated controls for this purpose, for various reasons none of these machines is entirely satisfactory when used as a transcribing device. This also applies even to some machines sold primarily for transcribing purposes. One serious difficulty with these machines is that they can mis-function when used by an inexperienced operator. Often this means that during starting or stopping the machine will apply excessive tension on the tape record, which at best is fragile and delicate, and thereby break the tape. Sometimes, instead, the machine will fail to maintain sufficient tension on the tape with the result that a good portion of it unwinds or "spills" from its reels. Even when a machine is free of these troubles it may be slow or awkward to operate and thus becomes inconvenient and difficult to use. The present invention provides a tape record machine free of these difficulties and which because of its many desirable characteristics is outstanding when used as a transcribing machine.

In accordance with the present invention there is provided a tape record machine with a drive mechanism including two spindles upon which the tape reels can be mounted and which are each driven by a separate clutch of unique design. The two clutches are identical and each has three operating conditions, namely "normal drive," "fast drive," and "neutral." The structure of the clutches permits the machine to be small in size and of good efficiency, and their design is such that mechanical inter-connection between them is easily achieved. Thus, it is easy to put one of the clutches in fast drive condition while simultaneously putting the other in neutral in order to rewind the tape at high speed. Further, in their normal drive condition each clutch applies an equal and precisely controlled drag to its respective spindle to tend to rotate the spindles counter to each other. The tape reels carried by the spindles then lightly stretch a length of tape between them and, being subjected to balanced torques, do not rotate until the tape is engaged by a drive capstan. When the tape is so engaged by the capstan, it drives the tape at normal speed in the forward direction, the slippage and drag of the spindle clutches serving to keep the tape taut and to insure that it is being properly reeled and un-reeled.

Also provided in this drive mechanism is an arrangement interlocking the action of the spindle clutches and the drive capstan. Thus, in switching from normal to high speed drive in either direction, there is neither a severe increase nor decrease in the tension on the tape. As a result, breakage or spillage of the tape is eliminated under all conditions.

A better understanding of the invention together with a fuller appreciation of its many advantages will best be gained from a study of the following description given in connection with the accompanying drawings wherein.

Figure 1:
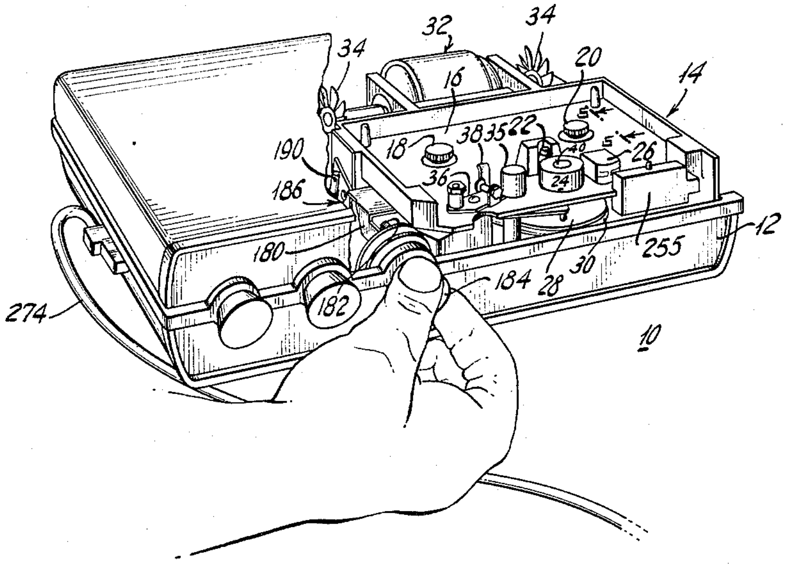
Figure 1 is a perspective view, looking down toward the left front corner of a tape record transcribing machine, partly broken away, embodying features of the invention.

The tape machine 10 shown in Figure 1, whose size relative to a person's hand is as indicated, comprises a housing 12 within which is mounted a tape transport mechanism, generally indicated at 14. This mechanism has a rigid frame 16 which carries the two spindles 18 and 20 (spaced apart) whose top ends are splined to receive two mating tape record reels. A tape record is adapted to be stretched between these reels along the front part of a transport mechanism, comprising a drive capstan 22 and a rubber idler roller 24, past the reproducing head 26. An erase magnet 35 is mounted on the opposite side of the capstan. Idler roller 24 is rotatably mounted on a shaft which can be moved toward or away from the capstan to produce friction between the tape and the capstan, or not, as desired. Control of this idler is effected by a solenoid and linkage shortly to be described.

During operation of the machine a controlled drag is applied to each spindle by its associated clutch, also shortly to be described, and the tape is engaged and disengaged by the rotating capstan which in turn causes the tape to move in the forward direction or to stop. For fast forward or reverse driving, the capstan is left disengaged from the tape and one spindle is driven at high speed by its respective clutch while the other is allowed to rotate freely at whatever speed demanded by the driven spindle. In switching from fast drive to normal drive, or to reverse, each spindle is independently braked to a quick stop, and thereafter the normal or the reverse drive elements are permitted to operate. Thus, too much or too little tension on the tape is avoided. While the machine is turned on, even though the tape is stopped, the capstan and the motor side of the two spindle clutches are rotated continuously along with the motor. The speed of the latter is manually adjustable by a suitable electric power control circuit.

As seen in Figure 1, capstan 22 extends a short distance above frame 16 in which it is rotatably journalled. The underside portion of the capstan, i.e. the portion beneath frame 16, carries a fly-wheel 28 which (see also Figure 3) is driven by its belt 30 from a hub on one of the reel spindles, the latter in turn being driven by the motor 32 through the belt 33. The motor on the opposite ends of its shaft carries ventilating fans 34.

As seen in Figure 1, mounted on frame 16 to the left of idler roller 24 is a small permanent magnet 35 carried on arm 36 and which can be swung into contact with the record tape to erase the signal on it. Arm 36 carries an upstanding tab 38 whose top is bent inward slightly and which prevents insertion of the tape when the magnet is in erase position.

Figure 2:
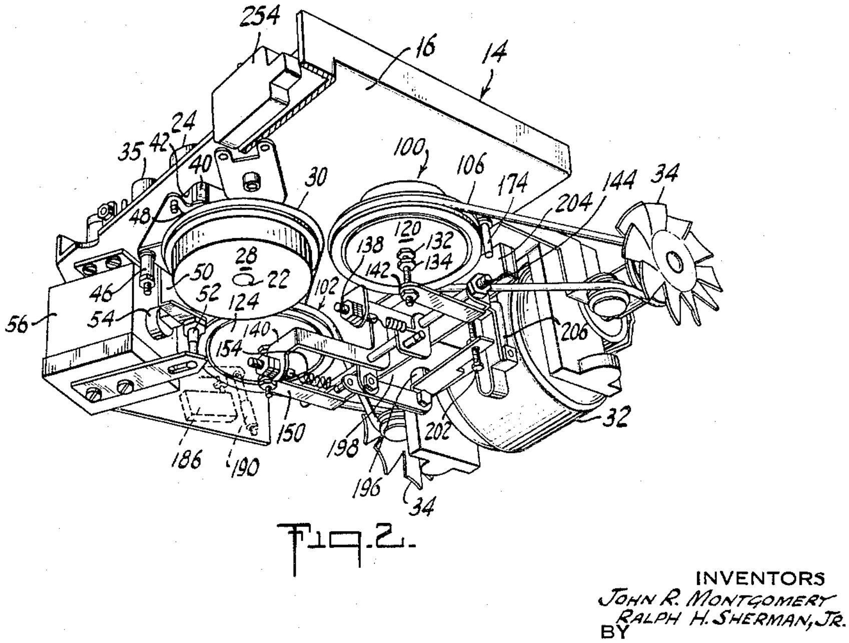
Figure 2 is a perspective view of the right front corner of the tape-handling mechanism of the machine of Figure 1, the other parts of the machine being omitted.
Figure 4:
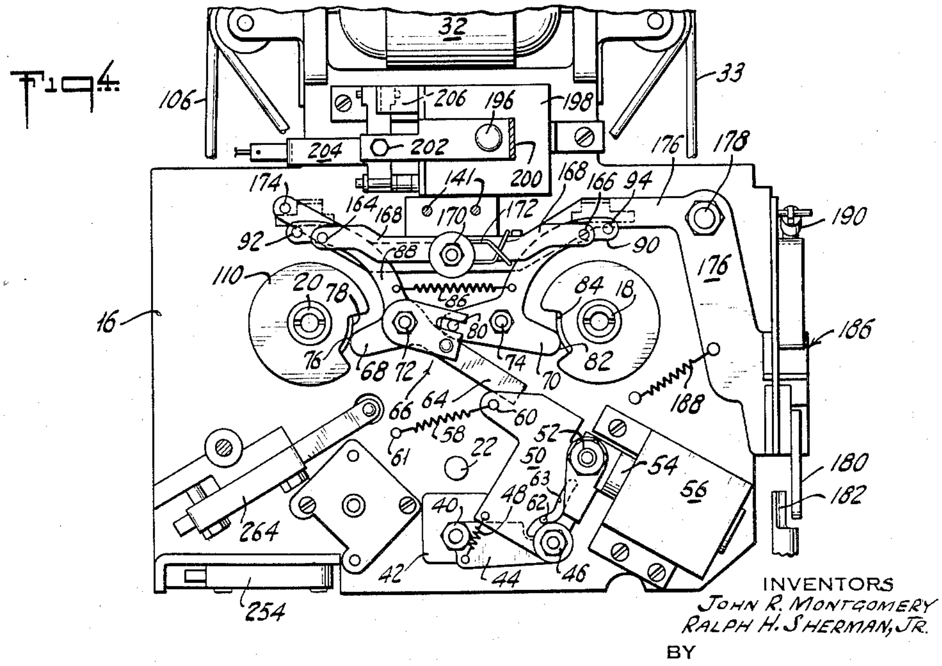
Figure 4 is a view similar to Figure 3 but showing the underneath parts not shown in Figure 3 and omitting those lying above.

Idler roller 24 is journalled on a shaft 40 which as seen in Figures 2 and 4, passes downward through the opening 42 in frame 16. The lower end of shaft 40 is mounted on the arm 44 which is pivoted to the frame at 46. This arm is connected by the tension spring 48 to a second pivoted arm 50 also pivoted to the frame at 46. When the latter is rotated clockwise as viewed in Figure 4, it carries arm 44 with it thereby moving idler roller 24 toward the capstan and holding the idler against it with a pressure determined by the tension of spring 48. Arm 50 is pivoted at 52 to the armature 54 of a solenoid 56. When the solenoid is energized, arm 50 as viewed in Figure 4 is pulled clockwise against the tension of the spring 58 fixed to it by a pin 60 and to the frame at 62. When the solenoid is not energized, these parts occupy the position shown.

As seen in Figure 4, positioned behind arm 50 is a pin 62 projecting downward (upward here) from arm 36 through a slot 63 in frame 16. When magnet 35 on arm 36 is in neutral position this pin is positioned near pivot 46 and allows arm 50 to be actuated by solenoid 56. When the magnet is in erase position, pin 62 moves forward in its slot and locks arm 50 against rotation thus preventing inadvertent normal drive operation of mechanism 14.

Pin 60 on arm 50 projects upward toward frame 16, i.e. downward in Figure 4, and is adapted, when the arm is swung clockwise, to cam against the lever 64 which when moved actuates a scissors linkage, generally indicated at 66, to release the spindle brakes. Linkage 66 includes a first three-stem arm 68 and a second three-stem arm 70, these being pivoted to the frame at the points 72 and 74 respectively. Lever 64 is fastened to arm 68 and rotates it counterclockwise when solenoid 56 is energized thereby moving the rounded brake shoe 76 of arm 68 out of contact with the rubber brake wheel 78 carried on the lower end of spindle 20. Arm 68 in rotating counter-clockwise causes equal and opposite rotation of arm 70 through the pin and slot coupling 80 and thereby the brake shoe 82 of arm 70 is retracted from contact with the rubber brake wheel 84 on spindle 18. The brake shoes 76 and 82 are held in engagement with their respective brake wheels as shown in Figure 4 by the tension spring 86 connected between stem 88 on arm 68 and stem 90 on arm 70.

Figures 7, 8:
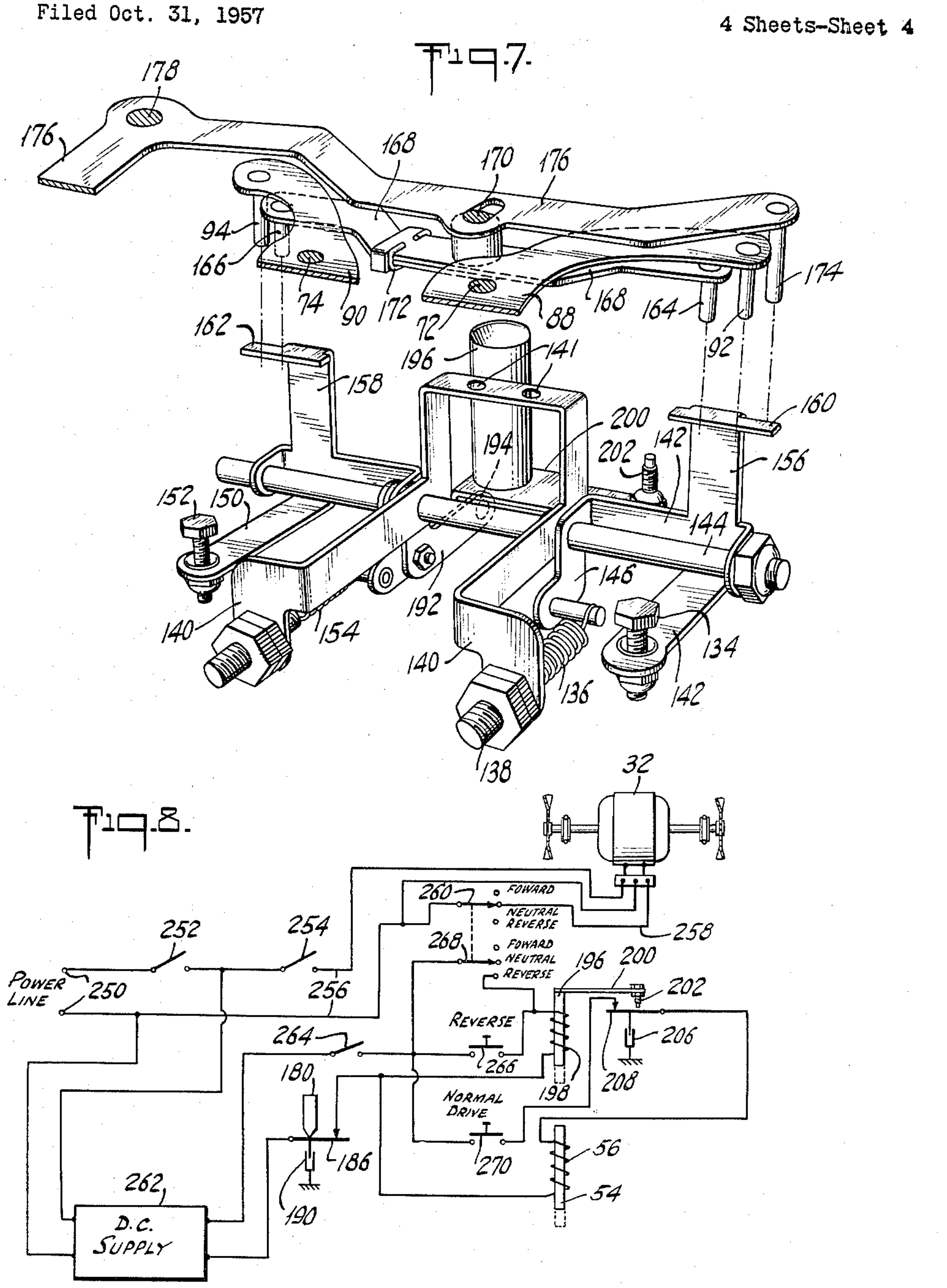
Figure 7 is an enlarged perspective view of the clutch-operating elements shown in Figure 2 as seen from the bottom of the mechanism of Figure 2 but shown at a slightly different angle.
Figure 8 is a wiring diagram of the control portion of the electrical circuit of the machine of Figure 1.

The outer ends of these stems carry the pins 92 and 94 respectively, which project upward from the plane of the drawing in Figure 4 and downward in Figure 7. These pins, actuated in a way described below, also release both brakes when the drive mechanism is switched to fast forward or to reverse drive. As seen in Figure 4, brakes 76 and 82 are slightly behind the line of centers of spindles 18 and 20 and pivots 72 and 74. Accordingly, even when the brakes are engaged spindle 18 can slip counter-clockwise relative to the brake though not clockwise, and spindle 20 can slip clockwise but not the reverse. This prevents the tape reels, upon switching from drive to stop, from spilling tape.

Figure 5:
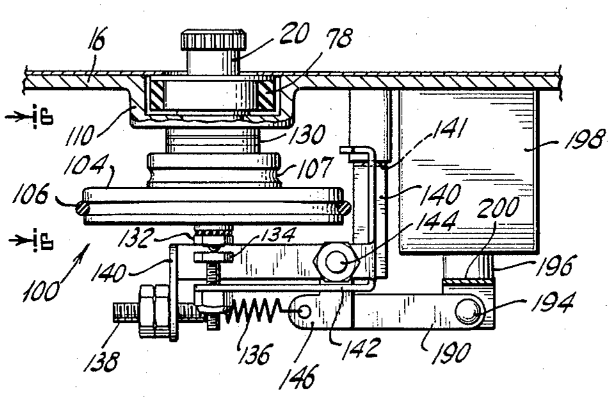
Figure 5 is an enlarged view, partly in section, of a reel spindle and its clutch taken in the direction of the lines 5—5 as indicated in Figure 1.
Figure 6:
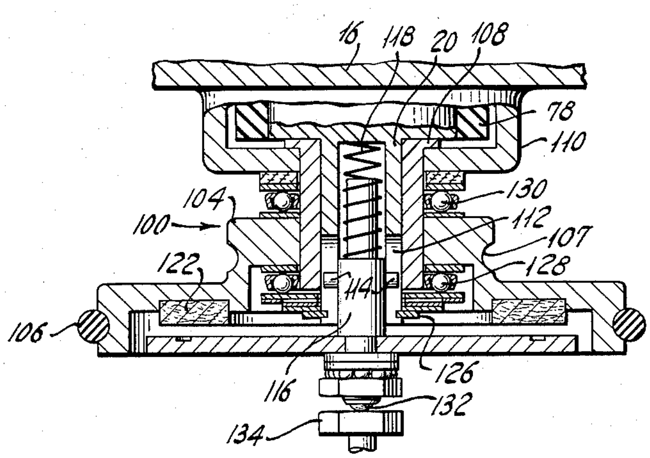
Figure 6 is a further enlarged view, also partly in section, of a spindle clutch taken in the direction of lines 6—6 as indicated in Figure 5.

Each reel spindle has associated with it a clutch through which it is driven from motor 32. Figures 5 and 6 show the clutch, generally indicated at 100, which is associated with spindle 20, the clutch 102 associated with spindle 18 being identical. Clutch 100 includes a hub 104 which on its outer rim carries a belt 106 running to one end of motor 32. When the motor is on, this hub, and the corresponding hub of clutch 102, driven by belt 33 rotate continuously. The hub of clutch 102 (see Figure 3) has a reduced diameter belt groove, identical to the groove 107 of hub 104 in Figure 7, which engages belt 30 to drive fly-wheel 28.

Hub 104 as seen in Figure 7 is rotatably mounted on the bronze bushing 108 whose upper end is force fitted in the bottom of the cup-like depression 110 of frame 16. Spindle 20 is rotatably mounted within bushing 108 and extends above it, brake wheel 78 being positioned within cup 110 as shown here and in Figure 4, the cup being cut away on one side to expose the wheel to the action of brake shoe 76.

As seen in Figure 6, the lower end of spindle 20 is splined at 112 and engages a pin 114 on the axle 116 so that the axle is movable longitudinally but not rotatably relative to the spindle. A spring 118 is positioned between axle and spindle to push the former downward as shown. Fastened on the bottom end of the axle is a clutch disc 120 which is adapted to move upward against the felt ring 122 thereby to frictionally engage the hub. This ring is advantageously made of Dacron felt. The inter-connecting linkage whereby this disc is moved in conjunction with the corresponding disc 124 of clutch 102 will be described shortly.

As seen in Figure 6 the lower end of spindle 20 is fitted with a retaining ring 126 which bears upward against a thrust bearing assembly 128 placed between it and the inside of hub 104. A second thrust bearing assembly 130 is positioned between the top of hub 104 and the bottom of cup 110.

As mentioned previously, each clutch has three conditions of drive, namely: normal, fast and disengaged. Clutch 100 as shown in Figure 6 is disengaged. To put it in normal drive condition disc 120, which on its underface carries the ball bearing 132, is contacted on this bearing by the screw head 134 which moves the disc upward against felt ring 122. As seen in Figures 2, 3, 5 and 7, the force exerted by head 134 is determined by a spring 136 whose tension is adjustable by means of the set screw 138, supported from frame 16 by means of the bent bracket 140. The latter is attached to frame 16 by screws at points 141. Screw head 134 is carried on a cantilever arm 142 whose other end is pivoted on the stationary axle 144 carried by bracket 140, the pivoted end of this arm having a forward extending tab 146 attached to an end of spring 136. Thus, tension of this spring tends to rotate clutch disc 120 upward as viewed in Figure 5.

Figure 3:
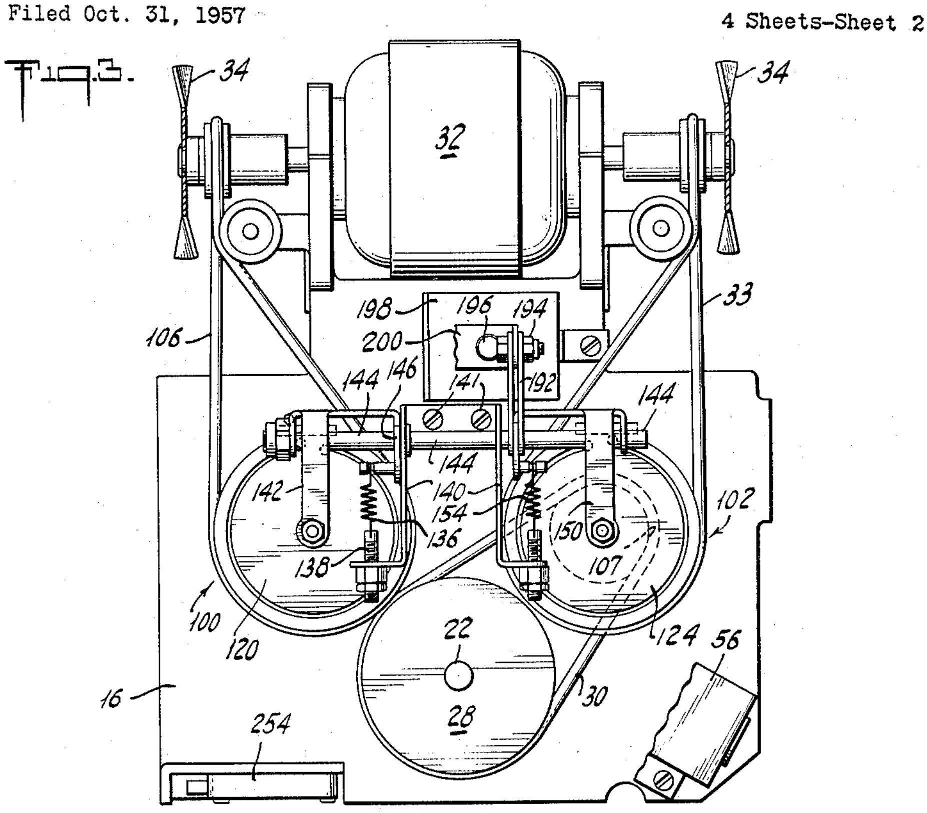
Figure 3 is a bottom plan view of the mechanism shown in Figure 2, certain parts lying beneath those shown being omitted for clarity.

As seen in Figures 3 and 7, axle 144 rotatably supports in connection with the other clutch disc, disc 124, a similar pivoted arm 150 carrying a screw head 152 and urged against disc 124 by an adjustable tension spring 154. During normal drive operation, springs 136 and 154 urge with equal force their respective clutch discs frictionally against the felt rings carried by the continuously rotating hubs of the clutches.

Figure 7 shows the upward extending lever extension or leg 156 at the rear of pivoted arm 142 and the similar leg 158 of pivoted arm 150. The top ends of these legs carry the feet 160 and 162, respectively, which engage on their front faces the pins 92 and 94 (shown in exploded relation to these pins). These pins it will be remembered are mounted on the ends of stems or arms 88 and 90 (see Figure 4) which control the spindle brake shoes 76 or 82. Forward movement of either pin 92 or 94 as seen in Figure 4 and Figure 7 will release both brakes.

Pins 92 and 94 are normally positioned relative to feet 160 and 162 so that the upward movement of either arm 142 or 150 from the position shown in Figure 7 to push a clutch disc into full engagement with its corresponding hub will release the spindle brakes. However, when the clutches are both in normal condition, i.e. both clutch discs bear with equal frictional force against their corresponding hubs, neither pin 92 or 94 is in engagement with a foot 160 or 162, the spindle brakes for this condition being released by pin 60 upon actuation of solenoid 56 which engages the idler roller against the capstan.

As seen in Figure 7, the front faces of feet 160 and 162 are also adapted to be engaged by the pins 164 and 166, these pins being carried on opposite ends of the pivoted beam or see-saw link 168 (see also Figure 4). This beam is pivoted to the frame at 170 and comprises two halves each pivoted at point 170 and spring loaded in-line by the pinch spring 172. By virtue of this arrangement, deflection of pin 164 forward, for example, by foot 160 sufficient to move the two halves of beam 168 out of line slightly, results in exerting a backward force by pin 166 against shoe 162, the magnitude of this force being determined by the pinching force of springs 172 and not directly by the force on pin 164. Similarly, a forward deflection of pin 166 sufficient to deflect spring 172 results in a maximum backward force on pin 164 determined by the spring. Thus, when clutch disc 120 as seen in Figure 6 is disengaged from its hub, the depressed position of screw head 134 will be translated through forward motion of foot 160 (Figure 7). This results in a swinging of beam 168 and pin 166 backward against foot 162 and a raising of screw head 152. This forces clutch disc 124 into full driving engagement with its hub with a force determined by the flexure of spring 172, the downward movement of screw 134 being sufficient to insure such flexure.

With reference again to Figure 7, the rear face of foot 160 is adapted to be engaged by the pin 174 carried on the end of the L-shaped beam 176. This beam (see also Figure 4) is pivoted at its elbow 178 to frame 16 and extends forward and alongside the frame from this pivot. The forward end of beam 176 comprises the flat tab 180, which is adapted to be moved outward from the frame from the position shown in Figure 4 by the rotary cam 182. The latter, as seen in Figure 1, is carried on the inner end of the control knob 184 and when this knob is turned clockwise, the machine is put in fast forward drive. As can be seen in Figures 3 and 7, outward displacement of the tab end of L beam 176 causes the pin 174 to move foot 160 forward. This disengages clutch 120 and in the manner described above causes full engagement of clutch 124 at the same time releasing the spindle brakes.

The outward camming of the tab end of L beam 176 also causes the actuation of the switch 186 (see also in Figures 1 and 2) which opens the electric circuit to solenoid 56 and prevents the idler roller from being engaged during fast forward drive. When control knob 184 is rotated back to normal drive position, beam 176 is returned to the position of Figures 3 and 7, the beam being biased to this position by the tension spring 188 fixed to it near its forward or tab end. Immediately upon the return of this beam, the clutches are released to normal position and the spindle brakes are applied. However (see Figures 1 and 2) switch 186 is mechanically held open for a short time by the dash pot 190 and therefore before the idler roller can again engage the capstan shaft to drive the tape, the spindles and tape reels will have had time to stop. Thus undue strain on the tape record is avoided. The complete electric circuit for the tape drive mechanism will be described shortly.

To put the clutches into reverse drive, arm 150 as seen in Figure 7 is moved down which in turn moves arm 142 up. The moving of arm 150 is accomplished through the backward extending portion of it indicated at 192 (see also Figures 2 and 3) which is pivoted at 194 to a solenoid armature 196. The latter is drawn upward into the solenoid core 198, fixed to frame 16, when the solenoid is energized.

As seen best in Figures 2 and 4, armature 196 has fastened to it a bar 200 whose opposite end, carrying the adjusting screw 202, is adapted to actuate the switch 204 when the armature moves into the solenoid. Actuation of switch 204 disables the idler roller solenoid 56, as is the case with switch 186 previously described. Switch 204 has associated with it a dash-pot 206 which, when solenoid 198 is de-energized, delays the de-activation of switch 204.

The wiring diagram of the electric circuit controlling the operation of motor 32 and of solenoids 56 and 198 is shown schematically in Figure 8. Power line voltage is applied to the terminals 250 and when the switches 252 and 254, in series with the terminals 250 are closed, motor 32 will be energized through the leads 256. Motor 32 is advantageously of the two phase, capacitor run type with speed adjustable, as is known in the art, by a variable direct current passed into one of the phases, this current being derived through the conductor 258 and a switch 260 from a rectifier, not shown. When conductor 258 is energized, motor speed will be slowed to a value determined by an adjusting rheostat, not shown, but which can be manually controlled by the operator of the machine.

Connected in series with switch 252 to the power line is a D.C. supply 262 adapted to power the solenoids 56 and 198. The output current from supply 262 is applied through a switch 264, through the "reverse" push-button switch 266, and through switch 186 (previously described), to solenoid 198. When this solenoid is energized, it moves the spindle clutches to reverse drive condition. Paralleling "reverse" switch 266 is a switch 268 ganged with switch 260, both switches being controlled by knob 184. Each of these switches has the three positions indicated; when they are in "forward" position, tab 180 holds switch 186 open; in "neutral," conductor 258 is energized; and in "reverse" solenoid 198 is energized.

When solenoid 198 is energized the pull on its armature 196 through bar 200 and adjusting screw 202 opens switch 204 which is normally closed. The closing of this switch after release of armature 196 is delayed a brief instant, as mentioned previously, by dash-pot 206. The opening of switch 204, which is in series with the idler roller solenoid 56 prevents actuation of the solenoid from supply 262 even though the "normal drive" push button switch 270 is closed.

Switch 252 represents the main on-off switch of the machine. Switch 264, which is normally open, is closed only when a tape record has been properly placed on the spindles thereby preventing false operation. Similarly switch 254, normally open, is provided so that the machine will not operate unless its top cover is closed. The actual position of these last two switches is shown in Figure 3. Push button switches 266 and 270 can be combined in a foot control unit, not shown, connected to the machine by cable 274 seen in Figure 1.

The electric circuit for the amplifier and reproducing head has not been shown because it can be one well known in the art. The circuit elements for this amplifier along with certain parts of the motor speed control circuit are mounted within housing 12 of the machine to the left of the tape drive mechanism as seen in Figure 1.

The description of the machine shown herein is intended in illustration and not in limitation of the invention. Various changes in the machine described may occur to those skilled in the art and these can be made without departing from the spirit or scope of the invention as set forth.

We claim:

1. A compact and efficient tape record driving mechanism comprising a frame, two spindles rotatably mounted thereon and each adapted to drive a tape reel, a three position clutch on the lower end of each spindle, each clutch having a hub rotatably mounted around said spindle and a clutch disc splined to said spindle, each said disc being movable to disengage said hub or to normally engage it with a slipping force or to fully engage it with a non-slipping force, motor means for continuously rotating said hubs in opposite directions relative to each other, means for actuating said clutches including a mechanical interconnection which disengages one disc when the other is fully engaged and vice versa, electric solenoid means for fully engaging one disc and disengaging the other, a drive capstan, an idler roller, a drive solenoid to pinch the roller and capstan together with a tape record between, and time delay means for preventing actuation of said drive solenoid for a brief instant after said electric solenoid means is de-actuated.

2. In a tape record drive mechanism, a frame, two reel spindles mounted on said frame, two mechanical clutches, each associated with a respective spindle and each having a hub adapted to be continuously rotated and a friction clutch disc splined to said spindle and axially movable relative to said hub into fully engaged non-slipping drive, normal slipping drive and disengaged positions, and lever means mechanically interconnecting said discs so that disengagement of one causes full engagement of the other and vice versa, said lever means normally urging both said discs into normal drive condition.

3. The structure as in claim 2 wherein said lever means includes a see-saw beam having two halves pivoted together at a center point, and a pinch-type spring urging said halves in-line to each other.

4. The structure as in claim 2 wherein said lever means includes an upstanding bracket fixed to said frame midway between said spindles, an axle mounted on said bracket, a first pivoted arm engaging one clutch disc and a second pivoted arm engaging the other disc, said arms being supported at their rear ends on said axle, a see-saw beam adapted to engage said arms to depress one when the other is raised, and two springs each fixed between a point on said bracket and a respective one of said arms to hold said discs in normal drive with equal light friction forces against their hubs.

5. The structure as in claim 4 wherein said beam is laterally flexible and is held unflexed by a pinch spring.

6. The structure as in claim 4 wherein each arm has an integral leg extending from said axle, the legs being parallel to each other and terminating in feet, said beam being engageable with said feet, a brake for each spindle, and brake release means engageable alternatively by said feet, said brake release means serving to release the brakes from both spindles when either of said clutches is fully engaged.

7. The structure as in claim 6 in further combination with a first solenoid adapted to disengage one clutch and fully engage the other, a capstan, an idler roller, a second solenoid for moving said roller against said capstan, an energizing lead to said second solenoid, a brake lever for releasing the spindle brakes when said roller is against said capstan, and time delay switch means for interrupting said energizing lead to said second solenoid until shortly after said discs have returned to normal position.

8. The structure as in claim 7 in further combination with a manual lever engageable with one of said feet to fully engage said one clutch and disengage said other clutch, said lever and said first solenoid each being adapted to actuate said time delay switch means.

9. The structure as in claim 8 in further combination with a motor for continuously rotating said hubs counter to each other and for rotating said capstan, and motor speed control means, said speed control means being disengaged upon actuation of said time delay switch means to permit said motor to run at maximum speed.

10. In a tape record machine, a reel spindle rotatably mounted through a frame deck, and a clutch mounted on the lower end of said spindle, said clutch including a hub adapted to be rotated continuously and having a large diameter open end, an annular friction surface positioned in said end, an axle splined in the end of said spindle and carrying a disc adapted to be moved against said annular surface or away therefrom, and means to move said disc against said annular surface with a light force to permit controlled slipping or with a heavier force to hold said disc against said hub without slipping and alternatively to move said disc out of engagement with said annular surface.

11. The structure as in claim 10 wherein a brake wheel is attached to said spindle and a brake shoe adapted to engage said brake wheel.

12. The structure as in claim 11 in further combination with a second spindle and clutch like the first, link means to interconnect said clutch discs for see-saw movement so that when either one is fully engaged the other is disengaged and when one is lightly engaged the other is lightly engaged with the same force, and brake release means operable by said link means so that when either disc is fully engaged, the brake shoes are released from engagement with said wheels.

13. An improved tape record playing mechanism comprising a pair of reel spindles journalled in a frame, a pair of clutches each associated with a respective spindle and having three alternate conditions of fully engaged, partly engaged and disengaged, linkage means interconnecting said clutches to fully engage one and disengage the other and vice versa, a drive capstan, and driving and time delay means connected to said capstan and said clutches to drive them but to prevent immediate actuation of said capstan for an instant after said clutches are switched from fully engaged and disengaged conditions to partly engaged condition.

References Cited in the file of this patent

UNITED STATES PATENTS

| | | |
|---|---|---|
| 2,266,755 | Herzig | Dec. 23, 1941 |
| 2,317,290 | McIlvried | Apr. 20, 1943 |
| 2,675,185 | Zenner | Apr. 13, 1954 |
| 2,712,448 | Schroter | July 5, 1955 |
| 2,792,217 | Weidenhammer et al. | May 14, 1957 |
| 2,855,160 | Fundingsland | Oct. 7, 1958 |